United States Patent [19]
Kempf

[11] Patent Number: 5,666,413
[45] Date of Patent: Sep. 9, 1997

[54] SCRAMBLER OF INFORMATION STORED ON MAGNETIC MEMORY MEDIA

[76] Inventor: Christopher J. Kempf, 7279 Woodale Dr. North, Carroll, Ohio 43112

[21] Appl. No.: 548,004

[22] Filed: Oct. 25, 1995

[51] Int. Cl.⁶ .............. H01F 13/00; G11B 3/66; G11B 5/02
[52] U.S. Cl. .............. 380/4; 361/151; 361/267; 360/66
[58] Field of Search .............. 380/4, 49, 50, 380/59; 361/143, 149, 151, 267; 360/118, 132, 133, 137, 66

[56] References Cited

U.S. PATENT DOCUMENTS

| | | | |
|---|---|---|---|
| 2,635,149 | 4/1953 | Cain | 360/118 |
| 3,660,727 | 5/1972 | Ohira et al. | 361/151 X |
| 4,157,581 | 6/1979 | Keiichi et al. | 361/267 |
| 5,132,860 | 7/1992 | Von Stein | 360/118 |

*Primary Examiner*—Bernarr E. Gregory
*Attorney, Agent, or Firm*—Kremblas, Foster, Millard & Pollick

[57] ABSTRACT

A device for scrambling the information held by magnetic memory storage media and rendering the information inaccessible. The portable device provides a passage through which a magnetic memory storage medium, also known as a diskette, passes in such proximity to magnetic material so that the magnetically sensitive components of the memory storage medium are thereby disordered by the force of the magnetic field emanating from the magnetic material.

8 Claims, 4 Drawing Sheets

SCRAMBLER OF INFORMATION STORED ON MAGNETIC MEMORY MEDIA

BACKGROUND OF THE INVENTION

1. Field of the Invention

This invention relates to the security of information stored on magnetic memory storage media from unauthorized use, specifically a device to permanently prevent the unauthorized access to information stored in memory by said media. The invention is a device for scrambling the information stored by magnetic memory storage media and rendering the information stored by said media inaccessible. The portable device provides a passage through which a magnetic memory storage medium passes in such proximity to other magnetic material so that the magnetically sensitive components of the memory storage medium are disordered by the force of the magnetic field emanating from the other magnetic material.

1. Background Information

Magnetic memory storage media, commonly and hereinafter referred to as diskettes, are typically used as vehicles to transfer information from one computer system internal memory storage drive to another computer system internal memory storage drive. Once the transfer of information from a diskette onto the second computer system internal storage device is completed, the information remains stored on the diskette. Diskettes are also typically used to store information copied from an internal memory storage drive in order to back-up the information in the event the information stored internally is lost, destroyed or otherwise rendered inaccessible. In either event, the information stored on the diskette can be either casually or intentionally accessed by unauthorized persons. The information can be accessed from the diskette with or without the use of the underlying control program or a program converter. Therefore, when an information transfer to or from a computer system internal memory storage drive by diskette is completed, or before any diskette storing confidential information is disposed, the information stored on the diskette needs to be rendered inaccessible for security reasons before the diskette is either lost, misappropriated, or disposed which would leave the information on the diskette accessible either by personnel, the public or other unauthorized parties.

Once information is stored on a magnetic memory storage medium, and the purpose of the storage is completed, the diskette is typically then either transferred, left unattended, or discarded with minimal or no security measures taken to guard the stored information against unauthorized access to the stored information. Examples of existing security measures for information on diskettes include limited access to the area of the physical storage of the diskette, and physical destruction of the diskette. Customarily, no security precautions are taken prior to further handling or disposal of diskettes.

Another perceived security option to supposedly protect information on diskettes is deleting information files on diskettes by computer system control programs. However, such action demands interruption of work, insertion of the diskette into the computer system, selection of control programs, selection of information storage files, engagement of the diskette drive mechanism, then removal of the diskette. Also, these procedures do not "clean" the memory storage sectors on a diskette but only mark them as being unused. The supposedly deleted information files can be reconstructed or rejuvenated by other computer system control programs.

These security lapses are solved by the invention.

DISCLOSURE OF INVENTION

Brief Summary of the Invention

The preferred embodiment of the invention quickly and permanently disrupts and disorders the magnetically sensitive components of the memory storage medium (diskette) so that any information stored by said medium is scrambled and rendered inaccessible. The device is portable and convenient to use, taking approx. 2 seconds to scramble information on an entire diskette. The device expediently and permanently enables an effective precaution to ensure that no information is accessed, transferred or absconded via discarded or carelessly handled diskettes.

Also, the device allows the scrambled diskette to be used again by a computer system to store information. For example, a manager could scramble confidential information, then give the diskette to support staff to use again without the risk that staff will access the theretofore confidential material on the diskette before re-use. The device also results in cost savings by not having to acquire new diskettes for those diskette consumers who would otherwise choose to destroy or discard the diskette at this point for security reasons. The device also saves wear and tear on the diskette drive of the computer system for those who would otherwise elect to engage the diskette drive mechanism to supposedly delete information files. For diskette users seeking an environmentally sensitive alternative to the disposal of plastic diskettes, the device will allow diskettes to be repeatedly recycled with each successive last user scrambling the diskette with the invention. In any event, the ease of such a security action enabled by the device program will encourage diskette users to become more security conscious by easily, swiftly, effectively and permanently scrambling information stored on diskettes.

OBJECTS AND ADVANTAGES

Accordingly, several objects and advantages of my invention are:

(a) to provide security of information stored on magnetic memory storage media;

(b) to enable permanent and effective disabling of information stored on magnetic memory storage medium without having to engage a computer system;

(c) to irrevocably render inaccessible information stored on magnetic memory storage media by quick and portable means;

(d) to quickly and efficiently disrupt and disorder the magnetically sensitive components of memory storage media so that the information held by said media is scrambled and rendered permanently inaccessible;

(e) to provide a portable, hand-held device for permanently scrambling the information held by magnetic memory storage media;

(f) to disable the information access capacity of magnetic memory storage media without a computer system, thereby saving wear and tear on a computer system diskette drive mechanism; and (g) to allow recycling of diskettes without subsequent users being able to access prior users' information; and (h) to encourage diskette users to become more security active by enabling easy, swift, effective and permanent facilitation of the scrambling of information on diskettes.

Brief Description of the Drawings The above objects, features and advantages of this invention will be apparent in the following detailed description of the preferred embodiment, especially when taken in conjunction with the accompanying drawings, wherein FIG. 1A–1D is an exploded view of the invention;

DESCRIPTION OF THE PREFERRED EMBODIMENT

Detailed Description

Figure 1D:
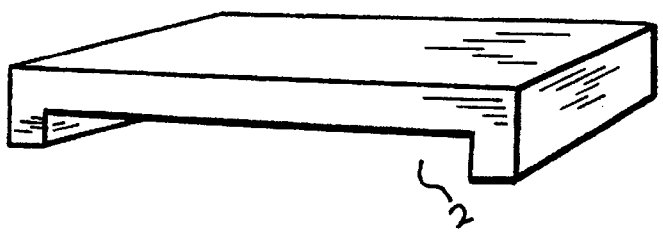
FIG. 1D is a perspective view of the top which canopies the cover and magnetic material.
Figure 1C:
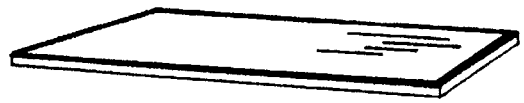
FIG. 1C is a perspective view of the cover of the magnetic material in the frame.
Figure 1B:
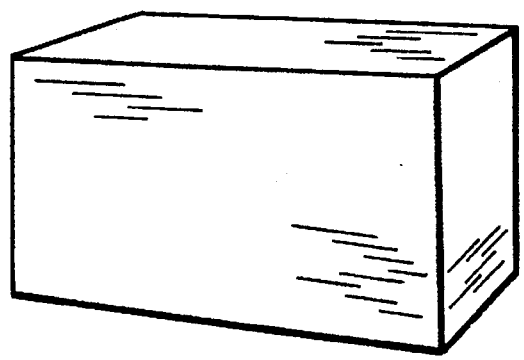
FIG. 1B is a perspective view of the magnetic material which is contained by the frame.
Figure 1A:
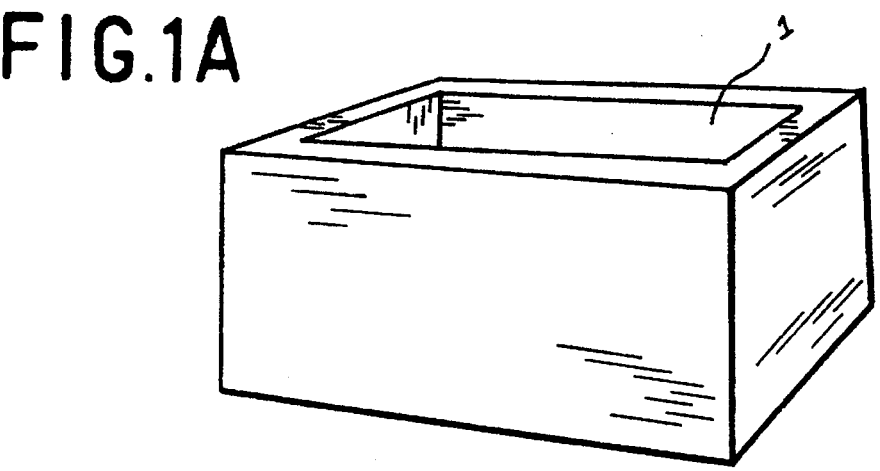
FIG. 1A is a perspective view of the frame.
Figure 2:
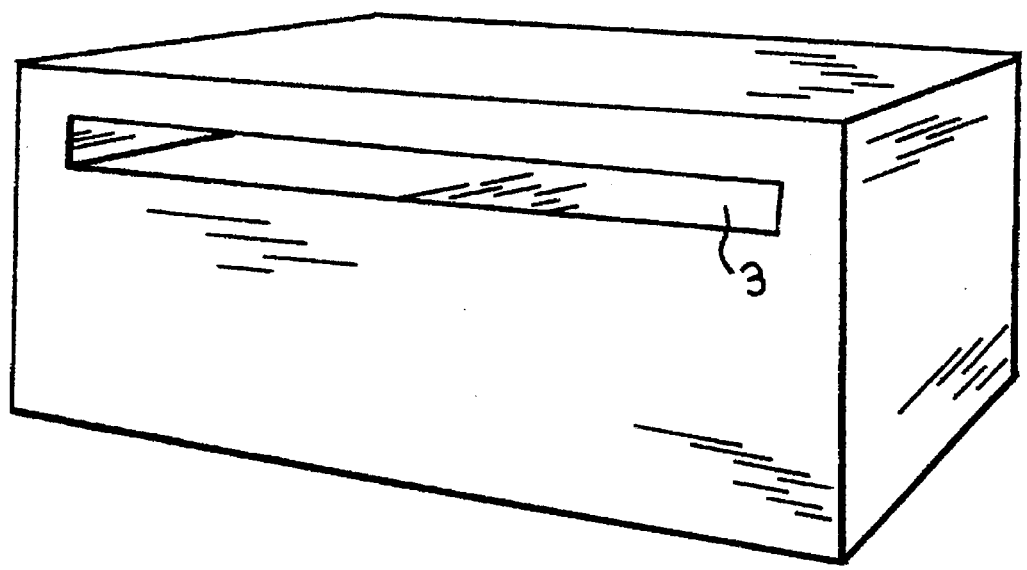
FIG. 2 is a perspective view of the invention.
Figure 3:
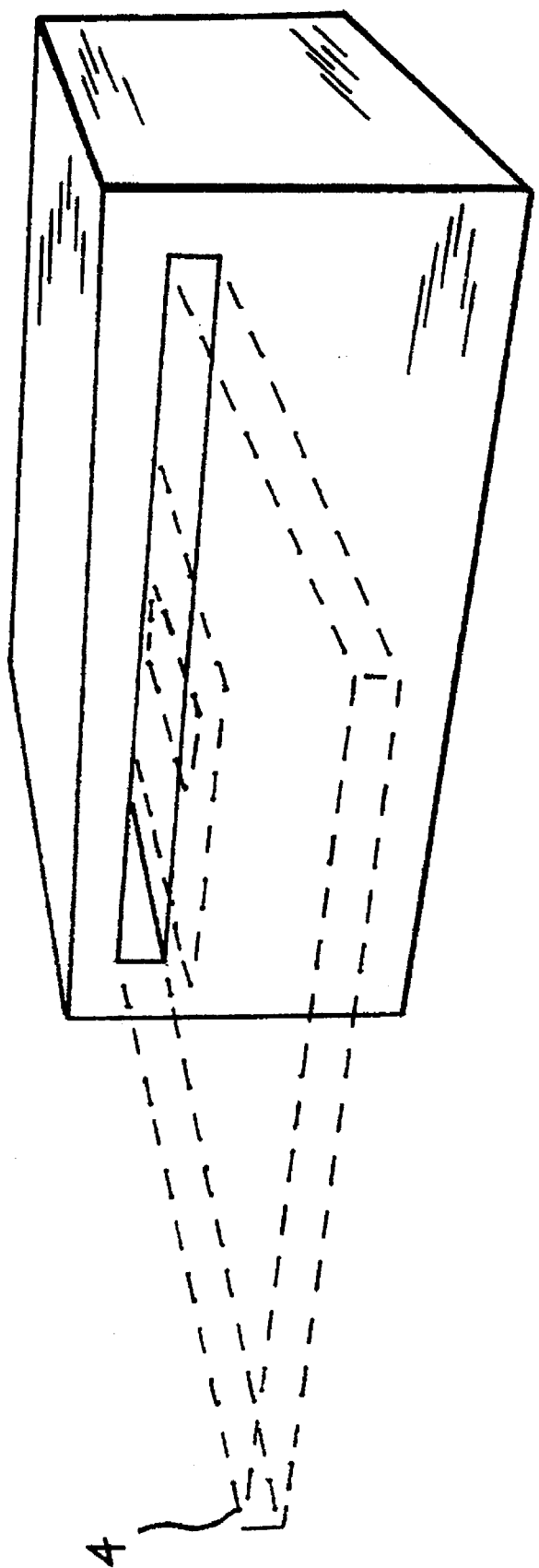
FIG. 3 is a perspective view of the invention showing how the diskette enters the invention.

Referring now to the drawings in detail, the frame (FIG. 1A) provides enough volume 1 so as to allow the magnetic material (FIG. 1B) to fit inside the frame. After the magnetic material is inserted into the frame a cover (FIG. 1C) is placed over the top surface area of the magnetic material. The purpose of said cover is to prevent erosion of the magnetic material by the friction of the passing diskette and to prevent particles of magnetic material from attaching to or collecting on the diskette. The cover must be sufficiently thin and of material so as to not significantly suppress the magnetic field. Assembly is completed by placing and affixing the top with downward extending perpendicular sides (FIG. 1D) which sides are also the sides of the passage space 2 over the frame, magnetic material and cover, leaving only enough passage space 3 (FIG. 2) to allow a diskette 4 to be inserted into the space and to pass through the space (FIG. 3).

Figure 4:
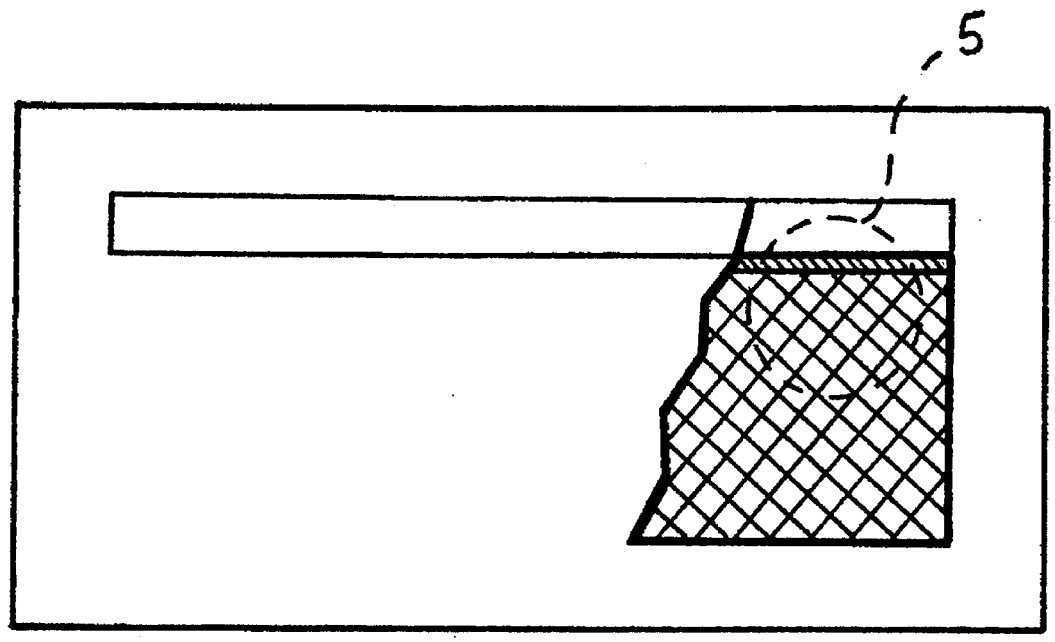
FIG. 4 is a direct frontal view of the invention with a partial cross-section of the space, cover and magnetic material.
Figure 5:
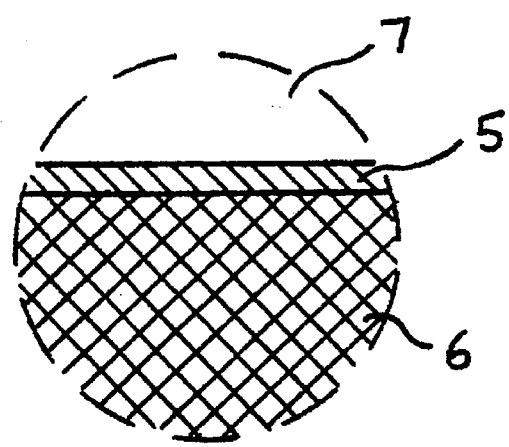
FIG. 5 is a magnified view of part of the direct frontal view of the invention with a partial cross-section of the space, cover and magnetic material.

FIG. 4 illustrates a partial cross-section of the device and FIG. 5 is an isolated close-up view showing the layering of the cover 5 on the magnetic material 6 below the space 7. The frame and top can be fabricated from a wide range of materials including plastic, wood and metals.

OPERATION

The diskette is manually inserted into the space and pulled out the other side of the space with the entire diskette having been caused to make contact with and slide over the cover and pass through the magnetic field emanating from the magnetic material. Once the diskette exits the space after making contact with and sliding over the cover and having passed through the magnetic field emanating from the magnetic material, the magnetically sensitive components of the diskette are disordered thereby scrambling the information stored on the medium due to the effect of said magnetic field.

SCOPE

Although a particular and preferred illustrative embodiment of the present invention has been described herein with reference to the accompanying drawings, the present invention is not limited to this particular embodiment. Various changes and modifications may be made thereto by those skilled in the art without departing from the spirit or scope of the invention. For example, the invention can be affixed to a container to collect and store the diskettes after they pass through the invention.

Thus the scope of the invention should be determined by the appended claims and their legal equivalents, rather than by the examples given.

SUMMARY AND RAMIFICATION OF THE INVENTION

Accordingly, the reader will see that the device can be used to easily and swiftly prevent information stored on a magnetic memory storage medium from being accessed by unauthorized parties. Furthermore, the device has additional advantages in that it enables security of information stored on magnetic memory storage medium;

it enables permanent and effective disabling of information stored on magnetic memory storage media without having to engage a computer system;

it irrevocably renders inaccessible information stored on magnetic memory storage medium;

it allows exigent and portable means to obliterate information from magnetic memory storage medium;

it quickly and efficiently disorders the magnetically sensitive components of memory storage media so that the information held by said media is scrambled and thereby rendered permanently inaccessible;

it provides a portable, hand-held device for permanently scrambling the information held by magnetic memory storage media;

it disables the information access capacity of magnetic memory storage media without the computer system, thereby saving wear and tear on a computer system and on the diskette drive;

it allows the easy recycling of magnetic memory storage medium without subsequent users being able to access prior users' information it encourages magnetic memory storage medium users to become more security active by enabling easy, swift, effective and permanent facilitation of the scrambling of information on diskettes.

I claim:

1. A device for preventing access to the information stored on a magnetic memory storage medium for electronic information processing comprising a container, and magnetic material, said container containing said magnetic material, said magnetic material having a magnetic field said container having a passage of sufficient size to allow the magnetic memory storage medium to pass by said magnetic material and through its magnetic field, said magnetic material being located on only one side of said passing said passage of the magnetic memory storage medium by said magnetic material and through its magnetic field causing the information stored on the magnetic memory storage medium to not be thereafter accessed by a computer system.

2. The device of claim 1 whereby said magnetic field is of a low enough intensity for enabling said medium to store new information to be read by a computer system after previously stored information has been rendered inaccessible by said device.

3. The device of claim 2 wherein said magnetic memory storage medium is a computer diskette.

4. The device of claim 1 wherein said magnetic memory storage medium is a computer diskette.

5. A device for disordering the magnetically sensitive components of a magnetic memory storage medium, and disabling the information held by a magnetic memory storage medium, the invention comprising, a frame, magnetic material, said magnetic material having a magnetic field emanating therefrom, said magnetic material being retained in said frame, and a cover, said magnetic material being covered within said frame by said cover, said cover being canopied by a top so as to form a passage space, said passage space between said cover and said top allowing a magnetic memory storage medium to pass therethrough, such that when the magnetic memory storage medium is caused to slide over the cover as the magnetic memory storage medium is manually inserted into and pulled through said passage space, the magnetic memory storage medium is caused to pass through the magnetic field emanating from said magnetic material.

6. The device of claim 5 whereby said magnetic field is of a low enough intensity for enabling the magnetic memory storage medium to store new information to be read by a computer system after previously stored information has been rendered inaccessible by said device.

7. The device of claim 6 wherein said magnetic memory storage medium is a computer diskette.

8. The device of claim 5 wherein said magnetic memory storage medium is a computer diskette.

* * * * *